United States Patent
Yamada et al.

(10) Patent No.: US 10,273,337 B2
(45) Date of Patent: Apr. 30, 2019

(54) METHOD FOR PRODUCING STRETCHED FILM

(71) Applicant: ZEON CORPORATION, Tokyo (JP)

(72) Inventors: Satoshi Yamada, Tokyo (JP); Shintarou Ikeda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/899,789

(22) PCT Filed: Jun. 24, 2014

(86) PCT No.: PCT/JP2014/066658
§ 371 (c)(1),
(2) Date: Dec. 18, 2015

(87) PCT Pub. No.: WO2015/002019
PCT Pub. Date: Jan. 8, 2015

(65) Prior Publication Data
US 2016/0137794 A1 May 19, 2016

(30) Foreign Application Priority Data

Jul. 1, 2013 (JP) ................................. 2013-137835

(51) Int. Cl.
| | | |
|---|---|---|
| *C08F 32/08* | (2006.01) | |
| *C08J 5/18* | (2006.01) | |
| *B29C 55/02* | (2006.01) | |
| *B29C 55/06* | (2006.01) | |
| *B29C 55/08* | (2006.01) | |
| *B29D 11/00* | (2006.01) | |
| *B29C 55/00* | (2006.01) | |
| *B29K 23/00* | (2006.01) | |
| *B29C 55/12* | (2006.01) | |
| *B29K 45/00* | (2006.01) | |
| *B29L 7/00* | (2006.01) | |
| *B29C 55/04* | (2006.01) | |

(52) U.S. Cl.
CPC ............... *C08J 5/18* (2013.01); *B29C 55/06* (2013.01); *B29C 55/08* (2013.01); *B29D 11/00788* (2013.01); *B29C 55/005* (2013.01); *B29C 55/02* (2013.01); *B29C 55/04* (2013.01); *B29C 55/12* (2013.01); *B29K 2023/38* (2013.01); *B29K 2045/00* (2013.01); *B29L 2007/008* (2013.01); *C08F 32/08* (2013.01); *C08F 2500/16* (2013.01); *C08F 2500/25* (2013.01); *C08F 2500/26* (2013.01); *C08G 2261/3325* (2013.01); *C08G 2261/418* (2013.01); *C08G 2261/724* (2013.01); *C08J 2345/00* (2013.01); *C08L 2207/10* (2013.01)

(58) Field of Classification Search
None
See application file for complete search history.

(56) References Cited

U.S. PATENT DOCUMENTS

| | | | |
|---|---|---|---|
| 2008/0158490 | A1 | 7/2008 | Nakayama et al. |
| 2009/0142516 | A1 | 6/2009 | Sasada |

FOREIGN PATENT DOCUMENTS

| | | | | |
|---|---|---|---|---|
| JP | H05-345817 | A | | 12/1993 |
| JP | 11-130846 | A | | 5/1999 |
| JP | 2002-194067 | A | | 7/2002 |
| JP | 2002194067 | A | * | 7/2002 |
| JP | 2006-052333 | A | | 2/2006 |
| JP | 2006083266 | A | * | 3/2006 |
| JP | 2007-031640 | A | | 2/2007 |
| JP | 2008-026881 | A | | 2/2008 |
| JP | 2008026881 | A | * | 2/2008 |
| JP | 2008-231318 | A | | 10/2008 |
| JP | 2008231318 | A | * | 10/2008 |
| JP | 2013-010309 | A | | 1/2013 |
| WO | WO-2014185253 | A1 | * | 11/2014 ............ C08F 210/02 |

OTHER PUBLICATIONS

Sep. 22, 2014 Search Report issued in International Application No. PCT/JP2014/066658.
Sep. 22, 2015 Written Opinion issued in International Patent Application No. PCT/JP2014/066658.
Nov. 7, 2017 Office Action issued in Chinese Application No. 201480037346.7.

* cited by examiner

*Primary Examiner* — Richard A Huhn
(74) *Attorney, Agent, or Firm* — Oliff PLC

(57) ABSTRACT

The present invention is a method for producing a stretched film comprising stretching an unstretched film that is formed using a hydrogenated dicyclopentadiene ring-opening polymer at a temperature of 95 to 135° C. and a stretching ratio of 1.2 to 10, followed by heating at a temperature of 150 to 220° C. Since the thus-obtained stretched film has excellent transparency and low coefficient of linear expansion, the stretched film is suitable for not only use in optical applications but also use for electronic materials.

3 Claims, No Drawings

METHOD FOR PRODUCING STRETCHED FILM

TECHNICAL FIELD

The present invention relates to a method for producing a stretched film having a low coefficient of linear expansion. The resulting stretched film may suitably be used as an optical material and an electronic material due to a low coefficient of linear expansion.

BACKGROUND ART

An alicyclic structure-containing polymer that is produced from a norbornene-based monomer (e.g., dicyclopentadiene) using a normal production method is an amorphous resin that does not have a melting point. A crystalline resin that has a melting point can be obtained by subjecting dicyclopentadiene to ring-opening polymerization using a specific catalyst, and hydrogenating the carbon-carbon double bonds included in the resulting ring-opening polymer.

Patent Documents 1 and 2 disclose that a hydrogenated dicyclopentadiene ring-opening polymer (i.e., crystalline resin) can produce a film that exhibits excellent heat resistance, excellent flatness, and low water absorption, and can be used in various fields.

Patent Document 3 discloses that a stretched film obtained by stretching a film formed of an amorphous alicyclic structure-containing polymer produced from a norbornene-based monomer is suitable as an optical film.

A film formed of an amorphous alicyclic structure-containing polymer is normally stretched at a temperature higher than the glass transition temperature.

RELATED-ART DOCUMENT

Patent Document

Patent Document 1: JP-A-2002-194067
Patent Document 2: JP-A-2013-010309
Patent Document 3: JP-A-2007-031640

SUMMARY OF THE INVENTION

Technical Problem

In view of the above situation, the inventors of the invention used a film formed of a hydrogenated dicyclopentadiene ring-opening polymer as an optical film, and found that the coefficient of linear expansion of the film increases at a high temperature. The inventors found that an increase in the coefficient of linear expansion at a high temperature can be suppressed by stretching the film.

The inventors conducted further studies, and found that a decrease in transparency occurs due to the stretching temperature, the stretching ratio, or the heating temperature after stretching.

An object of the invention is to provide a method for producing a stretched film that can efficiently produce a stretched film formed of a hydrogenated dicyclopentadiene ring-opening polymer that exhibits excellent transparency and has a low coefficient of linear expansion.

Solution to Problem

The inventors conducted extensive studies in order to solve the above problem, and found that a stretched film formed of a hydrogenated dicyclopentadiene ring-opening polymer that exhibits excellent transparency and has a low coefficient of linear expansion can be efficiently produced by stretching an unstretched film that is formed using a hydrogenated dicyclopentadiene ring-opening polymer at a specific stretching temperature and a specific stretching ratio, and heating the resulting stretched film at a high temperature. This finding has led to the completion of the invention.

Several aspects of the invention provide the following method for producing a stretched film (see (1) and (2)), optical film (see (3)), and electronic material (see (4)).

(1) A method for producing a stretched film including stretching an unstretched film that is formed using a hydrogenated dicyclopentadiene ring-opening polymer at a temperature of 95 to 135° C. and a stretching ratio of 1.2 to 10, followed by heating at a temperature of 150 to 220° C.
(2) The method for producing a stretched film according to (1), wherein the hydrogenated dicyclopentadiene ring-opening polymer is a crystalline resin.
(3) An optical film produced using the method for producing a stretched film according to (1).
(4) An electronic material produced using the method for producing a stretched film according to (1).

Advantageous Effects of the Invention

According to one aspect of the invention, it is possible to efficiently produce a stretched film formed of a hydrogenated dicyclopentadiene ring-opening polymer that exhibits excellent transparency and has a low coefficient of linear expansion.

A stretched film produced using the method for producing a stretched film according to one aspect of the invention is useful as an optical film and an electronic material.

DESCRIPTION OF EMBODIMENTS

An unstretched film used in connection with one embodiment of the invention is obtained by forming (molding) a hydrogenated dicyclopentadiene ring-opening polymer by extrusion or the like, the hydrogenated dicyclopentadiene ring-opening polymer being obtained by subjecting dicyclopentadiene to ring-opening polymerization, and hydrogenating the resulting dicyclopentadiene ring-opening polymer.

The hydrogenated dicyclopentadiene ring-opening polymer is crystalline and has a melting point. Various additives may optionally be added to the hydrogenated dicyclopentadiene ring-opening polymer.

The hydrogenated dicyclopentadiene ring-opening polymer that is crystalline and has a melting point may be produced using an arbitrary method. For example, the hydrogenated dicyclopentadiene ring-opening polymer may be produced using the method disclosed in JP-A-2006-52333. The method disclosed in JP-A-2006-52333 produces a dicyclopentadiene ring-opening polymer that has syndiotacticity, and hydrogenates the dicyclopentadiene ring-opening polymer to efficiently produce the desired hydrogenated dicyclopentadiene ring-opening polymer.

Dicyclopentadiene (starting material) may be present in the form of an endo-stereoisomer or an exo-stereoisomer. Both the endo-stereoisomer and the exo-stereoisomer can be used as the monomer. Either the endo-stereoisomer or the exo-stereoisomer may be used alone, or an isomer mixture that includes the endo-stereoisomer and the exo-stereoisomer in an arbitrary ratio may be used. Note that it is preferable to increase the ratio of the endo-stereoisomer or the exo-stereoisomer from the viewpoint of improving the crystallinity of the hydrogenated dicyclopentadiene ring-opening polymer, and further improving the heat resistance of the hydrogenated dicyclopentadiene ring-opening polymer. For example, it is preferable to set the ratio of the endo-stereoisomer or the exo-stereoisomer to 80% or more, more preferably 90% or more, and particularly preferably 95% or more. Note that it is preferable to increase the ratio of the endo-stereoisomer from the viewpoint of ease of synthesis.

The dicyclopentadiene ring-opening polymer may be produced by copolymerizing a monomer other than dicyclopentadiene with dicyclopentadiene as long as a crystalline dicyclopentadiene ring-opening polymer can be obtained. Examples of the monomer that may be copolymerized with dicyclopentadiene include a polycyclic norbornene-based monomer other than dicyclopentadiene, a bicyclic norbornene-based compound that does not include a cyclic structure that is fused with the norbornene skeleton, a monocycloolefin, a cyclic diene, and derivatives thereof.

A hydrogenated dicyclopentadiene ring-opening polymer that has syndiotacticity is obtained by hydrogenating a dicyclopentadiene ring-opening polymer that has syndiotacticity.

Therefore, it is necessary to use a ring-opening polymerization catalyst that can provide the resulting dicyclopentadiene ring-opening polymer with syndiotacticity when subjecting dicyclopentadiene to ring-opening polymerization. A ring-opening polymerization catalyst that includes a metal compound represented by the following formula (3) (hereinafter may be referred to as "metal compound (3)") as a catalytic active component is preferable as the ring-opening polymerization catalyst.

$$M(NR^8)X_{4-a}(OR^9)_a \cdot L_b \quad (3)$$

wherein M is a metal atom selected from the Group 6 transition metal atoms in the periodic table,
$R^8$ is a phenyl group that is unsubstituted or substituted at least one of the positions 3, 4, and 5, or a group represented by $CH_2R^{10}$, $R^{10}$ is a hydrogen atom, or a group selected from a substituted or unsubstituted alkyl group and a substituted or unsubstituted aryl group,
$R^9$ is a group selected from a substituted or unsubstituted alkyl group and a substituted or unsubstituted aryl group,
X is a halogen atom, or a group selected from an alkyl group, an aryl group, and an alkylsilyl group,
L is a neutral electron donor ligand,
a is 0 or 1, and
b is an integer from 0 to 2.

The metal atom (M) included in the metal compound (3) is selected from the Group 6 transition metal atoms (chromium, molybdenum, and tungsten) in the periodic table. Among these, molybdenum and tungsten are preferable, and tungsten is particularly preferable.

The metal compound (3) includes a metal-imide bond.

$R^8$ is a substituent that is bonded to the nitrogen atom that forms the metal-imide bond.

Examples of a substituent that may substitute the phenyl group that is unsubstituted or substituted at least one of the positions 3, 4, and 5, include an alkyl group such as a methyl group and an ethyl group; a halogen atom such as a fluorine atom, a chlorine atom, and a bromine atom; an alkoxy group such as a methoxy group, an ethoxy group, and an isopropoxy group; and the like. Note that substituents that substitute the phenyl group at least two of the positions 3, 4, and 5 may be bonded to each other.

Specific examples of the phenyl group that is unsubstituted or substituted at least one of the positions 3, 4, and 5, include a phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group and a 3,4,5-trichlorophenyl group; and a substituted or unsubstituted 2-naphthyl group such as a 2-naphthyl group, a 3-methyl-2-naphthyl group, and a 4-methyl-2-naphthyl group.

The number of carbon atoms of the substituted or unsubstituted alkyl group that may be represented by $R^{10}$ (included in the group represented by $CH_2R^{10}$ (that may be used as the substituent ($R^8$ in the formula (3)) that is bonded to the nitrogen atom included in the metal compound (3))) is not particularly limited. The number of carbon atoms of the substituted or unsubstituted alkyl group is normally 1 to 20, preferably 1 to 10, and more preferably 1 to 4. The alkyl group may be either linear or branched. Examples of a substituent that may substitute the alkyl group include, but are not limited to, a substituted or unsubstituted phenyl group such as a phenyl group and a 4-methylphenyl group; and an alkoxy group such as a methoxy group and an ethoxy group.

Examples of the substituted or unsubstituted aryl group that may be represented by $R^{10}$ include a phenyl group, a 1-naphthyl group, a 2-naphthyl group, and the like. Examples of a substituent that may substitute the aryl group include, but are not limited to, a substituted or unsubstituted phenyl group such as a phenyl group and a 4-methylphenyl group; an alkoxy group such as a methoxy group and an ethoxy group; and the like.

$R^{10}$ is preferably an alkyl group having 1 to 20 carbon atoms, such as a methyl group, an ethyl group, a propyl group, an isopropyl group, a butyl group, an isobutyl group, a t-butyl group, a pentyl group, a hexyl group, an octyl group, or a decyl group.

The metal compound (3) includes three or four groups selected from a halogen atom, an alkyl group, an aryl group, and an alkylsilyl group. Specifically, X in the formula (3) is a halogen atom, or a group selected from an alkyl group, an aryl group, and an alkylsilyl group. Note that the metal compound (3) may have a structure in which two or more groups represented by X are bonded to each other.

Examples of the halogen atom that may be represented by X include a chlorine atom, a bromine atom, and an iodine atom. Examples of the alkyl group include a methyl group, an ethyl group, a propyl group, an isopropyl group, a butyl group, an isobutyl group, a t-butyl group, a pentyl group, a neopentyl group, a benzyl group, a neophyl group, and the like. Examples of the aryl group include a phenyl group, a 4-methylphenyl group, a 2,6-dimethylphenyl group, a 1-naphthyl group, a 2-naphthyl group, and the like. Examples of the alkylsilyl group include a trimethylsilyl group, a triethylsilyl group, a t-butyldimethylsilyl group, and the like.

The metal compound (3) may include one metal-alkoxide bond or one metal-aryloxide bond. The substituent ($R^9$ in the formula (3)) that is bonded to the oxygen atom that forms the metal-alkoxide bond or the metal-aryloxide bond is a group selected from a substituted or unsubstituted alkyl group and a substituted or unsubstituted aryl group. Examples of the substituted or unsubstituted alkyl group and the substituted or unsubstituted aryl group that may be represented by $R^9$ include those mentioned above in connection with $R^{10}$.

The metal compound (3) may include one or two neutral electron donor ligands.

Examples of the neutral electron donor ligand (L in the formula (3)) include an electron donor compound that includes an atom among the Groups 14 and 15 atoms in the periodic table.

Specific examples of the neutral electron donor ligand include a phosphine such as trimethylphosphine, triisopropylphosphine, tricyclohexylphosphine, and triphenylphosphine; an ether such as diethyl ether, dibutyl ether, 1,2-dimethoxyethane, and tetrahydrofuran; an amine such as trimethylamine, triethylamine, pyridine, and lutidine; and the like. Among these, an ether is particularly preferable.

Examples of the metal compound (3) that may particularly preferably be used as the ring-opening polymerization catalyst used to produce a dicyclopentadiene ring-opening polymer that has syndiotacticity, include a tungsten compound that includes a phenylimide group (i.e., a compound represented by the formula (3) wherein M is a tungsten atom, and $R^8$ is a phenyl group). It is particularly preferable to use tetrachlorotungsten phenylimide-(tetrahydrofuran).

The metal compound (3) may be synthesized by mixing an oxyhalogenated product of a Group 6 transition metal, a phenyl isocyanate that is unsubstituted or substituted at least one of the positions 3, 4, and 5 (or monosubstituted methyl isocyanate), and a neutral electron donor ligand (L) optionally together with an alcohol, a metal alkoxide, or a metal aryloxide (e.g., the method disclosed in JP-A-5-345817), for example. The metal compound (3) thus synthesized may be purified and isolated by crystallization or the like, or the resulting solution may be used directly as the ring-opening polymerization catalyst without purification.

The metal compound (3) (that is used as the ring-opening polymerization catalyst) is normally used in such an amount that the molar ratio (metal compound (3):monomer in total) of the metal compound (3) to the monomer in total is 1:100 to 1:2,000,000, preferably 1:500 to 1:1,000,000, and more preferably 1:1,000 to 1:500,000. If the amount of the catalyst is too large, it may be difficult to remove the catalyst. If the amount of the catalyst is too small, sufficient polymerization activity may not be obtained.

The metal compound (3) may be used alone as the ring-opening polymerization catalyst. Note that it is preferable to use an organometallic reducing agent in combination with the metal compound (3) from the viewpoint of improving the polymerization activity.

Examples of the organometallic reducing agent include a compound that includes an element among the Groups 1, 2, 12, 13, and 14 elements in the periodic table, and a hydrocarbon group having 1 to 20 carbon atoms. An organolithium, an organomagnesium, an organozinc, an organoaluminum, and an organotin are preferable, and an organoaluminum and an organotin are particularly preferable.

Examples of the organolithium include n-butyllithium, methyllithium, phenyllithium, and the like. Examples of the organomagnesium include butylethylmagnesium, butyloctylmagnesium, dihexylmagnesium, ethylmagnesium chloride, n-butylmagnesium chloride, allylmagnesium bromide, and the like. Examples of the organozinc include dimethylzinc, diethylzinc, diphenylzinc, and the like. Examples of the organoaluminum include trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide, and the like. Examples of the organotin include tetramethyltin, tetra(n-butyl)tin, tetraphenyltin, and the like.

The organometallic reducing agent is preferably used in a 0.1 to 100-fold amount, more preferably a 0.2 to 50-fold amount, and particularly preferably a 0.5 to 20-fold amount (on a molar basis), based on the amount of the metal compound (3). If the amount of the organometallic reducing agent is too small, the polymerization activity may not be improved. If the amount of the organometallic reducing agent is too large, a side reaction may easily occur.

The polymerization reaction for producing the crystalline dicyclopentadiene ring-opening polymer is normally effected in an organic solvent. The organic solvent is not particularly limited as long as the organic solvent can dissolve or disperse the target ring-opening polymer (or a hydrogenated product thereof) under specific conditions, and does not hinder the polymerization reaction and the hydrogenation reaction.

Specific examples of the organic solvent include an aliphatic hydrocarbon such as pentane, hexane, and heptane; an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon such as benzene, toluene, and xylene; a halogen-containing aliphatic hydrocarbon such as dichloromethane, chloroform, and 1,2-dichloroethane; a halogen-containing aromatic hydrocarbon such as chlorobenzene and dichlorobenzene; a nitrogen-containing hydrocarbon-based solvent such as nitromethane, nitrobenzene, and acetonitrile; an ether such as diethyl ether and tetrahydrofuran; and a mixed solvent thereof. Among these, an aromatic hydrocarbon, an aliphatic hydrocarbon, an alicyclic hydrocarbon, and an ether are preferable.

The ring-opening polymerization reaction may be initiated by mixing the monomer and the metal compound (3) optionally together with the organometallic reducing agent. These components may be added in an arbitrary order. For example, a mixture that includes the metal compound (3) and the organometallic reducing agent may be added to the monomer, and the resulting mixture may be mixed, or a mixture that includes the monomer and the metal compound (3) may be added to the organometallic reducing agent, and the resulting mixture may be mixed, or the metal compound (3) may be added to a mixture that includes the monomer and the organometallic reducing agent, and the resulting mixture may be mixed.

Each component may be added at a time, or may be added stepwise. Each component may be added continuously over a relatively long time (e.g., 1 minute or more). It is preferable to add the monomer or the metal compound (3) either stepwise or continuously from the viewpoint of controlling the polymerization temperature and the molecular weight of the resulting ring-opening polymer to obtain a resin composition that exhibits excellent formability. It is particularly preferable to add the monomer either stepwise or continuously.

The monomer concentration in the organic solvent when effecting the polymerization reaction is not particularly limited, but is preferably 1 to 50 wt %, more preferably 2 to 45 wt %, and particularly preferably 3 to 40 wt %. If the monomer concentration is too low, the polymer productivity may decrease. If the monomer concentration is too high, the viscosity of the polymer solution may increase to a large extent, and it may be difficult to effect the subsequent hydrogenation reaction.

An activity modifier may be added to the polymerization system. The activity modifier may be used to stabilize the ring-opening polymerization catalyst, and adjust the rate of the polymerization reaction and the molecular weight distribution of the polymer.

The activity modifier is not particularly limited as long as the activity modifier is an organic compound that includes a functional group. An oxygen-containing organic compound, a nitrogen-containing organic compound, and a phosphorus-containing organic compound are preferable as the activity modifier. Specific examples of the activity modifier include an ether such as diethyl ether, diisopropyl ether, dibutyl ether, anisole, furan, and tetrahydrofuran; a ketone such as acetone, benzophenone, and cyclohexanone; an ester such as ethyl acetate; a nitrile such as acetonitrile and benzonitrile; an amine such as triethylamine, triisopropylamine, quinuclidine, and N,N-diethylaniline; pyridine and derivatives thereof such as pyridine, 2,4-lutidine, 2,6-lutidine, and 2-t-butylpyridine; a phosphine such as triphenylphosphine and tricyclohexylphosphine; a phosphate such as trimethyl phosphate and triphenyl phosphate; a phosphine oxide such as triphenylphosphine oxide; and the like. These activity modifiers may be used either alone or in combination.

The activity modifier may be added in an arbitrary amount. The activity modifier is normally added in a ratio of 0.01 to 100 mol % based on the metal compound that is used as the ring-opening polymerization catalyst.

A molecular weight modifier may be added to the polymerization system in order to adjust the molecular weight of the ring-opening polymer. Examples of the molecular weight modifier include an α-olefin such as 1-butene, 1-pentene, 1-hexene, and 1-octene; an aromatic vinyl compound such as styrene and vinyltoluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as arylchloride; a nitrogen-containing vinyl compound such as acrylamide; a non-conjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; and a conjugated diene such as 1,3-butadiene, 2-methyl-1,3-butadiene, 2,3-dimethyl-1,3-butadiene, 1,3-pentadiene, and 1,3-hexadiene.

The amount of the molecular weight modifier may be determined taking account of the desired molecular weight. The molecular weight modifier is normally added in a ratio of 0.1 to 50 mol % based on the monomer.

The polymerization temperature is not particularly limited, but is normally −78 to +200° C., and preferably −30 to +180° C. The polymerization time is not particularly limited, and is determined taking account of the reaction scale. The polymerization time is normally 1 minute to 1,000 hours.

A dicyclopentadiene ring-opening polymer that has syndiotacticity can be obtained by subjecting the monomer including dicyclopentadiene to ring-opening polymerization under the above conditions using the ring-opening polymerization catalyst that includes the metal compound (3).

The ratio of racemo diads in the dicyclopentadiene ring-opening polymer (that is subjected to hydrogenation) is not particularly limited, but is normally 60% or more, preferably 65% or more, and more preferably 70 to 99%. The ratio of racemo diads (i.e., the degree of syndiotacticity) in the dicyclopentadiene ring-opening polymer can be adjusted by appropriately selecting the type of the ring-opening polymerization catalyst, for example.

The weight average molecular weight (polyisoprene-equivalent weight average molecular weight) (Mw) of the dicyclopentadiene ring-opening polymer (that is subjected to hydrogenation) determined by gel permeation chromatography is not particularly limited, but is preferably 10,000 to 100,000, and more preferably 15,000 to 80,000.

A hydrogenated dicyclopentadiene ring-opening polymer that is produced using the dicyclopentadiene ring-opening polymer that has a weight average molecular weight within the above range exhibits excellent formability, and can produce a formed article that exhibits excellent heat resistance. The weight average molecular weight of the dicyclopentadiene ring-opening polymer can be adjusted by adjusting the amount of the molecular weight modifier used during polymerization, for example.

The molecular weight distribution (i.e., the ratio (Mw/Mn) of the polyisoprene-equivalent weight average molecular weight to the polyisoprene-equivalent number average molecular weight determined by gel permeation chromatography) of the dicyclopentadiene ring-opening polymer (that is subjected to hydrogenation) is not particularly limited, but is normally 1.5 to 4.0, and preferably 1.6 to 3.5.

A hydrogenated dicyclopentadiene ring-opening polymer that is produced using the dicyclopentadiene ring-opening polymer that has a molecular weight distribution within the above range exhibits excellent formability. The molecular weight distribution of the hydrogenated dicyclopentadiene ring-opening polymer can be adjusted by appropriately selecting the monomer addition method, and adjusting the monomer concentration when effecting the ring-opening polymerization reaction.

The dicyclopentadiene ring-opening polymer (i.e., the main-chain double bond of the dicyclopentadiene ring-opening polymer) may be hydrogenated by supplying hydrogen to the reaction system in the presence of a hydrogenation catalyst. The hydrogenation catalyst is not particularly limited as long as the hydrogenation catalyst is normally used when hydrogenating an olefin compound. Examples of the hydrogenation catalyst include the following catalysts.

Examples of a homogeneous catalyst include a catalyst system that includes a combination of a transition metal compound and an alkali metal compound, such as a combination of cobalt acetate and triethylaluminum, a combination of nickel acetylacetonate and triisobutylaluminum, a combination of titanocene dichloride and n-butyllithium, a combination of zirconocene dichloride and sec-butyllithium, and a combination of tetrabutoxytitanate and dimethylmagnesium. Further examples of the homogeneous catalyst include a noble metal complex catalyst such as dichlorobis(triphenylphosphine)palladium, chlorohydridocarbonyltris(triphenylphosphine)ruthenium, bis(tricyclohexylphosphine)benzylidineruthenium(IV) dichloride, and chlorotris(triphenylphosphine)rhodium.

Examples of an inhomogeneous catalyst include nickel, palladium, platinum, rhodium, and ruthenium, and a solid catalyst in which a metal among these metals is supported on a carrier such as carbon, silica, diatomaceous earth, alumina, or titanium oxide (e.g., nickel/silica, nickel/diatomaceous earth, nickel/alumina, palladium/carbon, palladium/silica, palladium/diatomaceous earth, and palladium/alumina).

The hydrogenation reaction is normally effected in an inert organic solvent. Examples of the inert organic solvent that may be used for the hydrogenation reaction include an aromatic hydrocarbon such as benzene and toluene; an aliphatic hydrocarbon such as pentane and hexane; an alicyclic hydrocarbon such as cyclohexane and decahydronaphthalene; an ether such as tetrahydrofuran and ethylene glycol dimethyl ether; and the like. The inert organic solvent may normally be the same as the solvent used for the polymerization reaction. Specifically, the hydrogenation catalyst may be added directly to the polymer solution, and the hydrogenation reaction may then be effected.

The hydrogenation reaction may be effected under different conditions depending on the hydrogenation catalyst. The reaction temperature (hydrogenation temperature) is normally −20 to +250° C., preferably −10 to +220° C., and more preferably 0 to +200° C. If the hydrogenation temperature is too low, the reaction rate (hydrogenation rate) may decrease to a large extent. If the hydrogenation temperature is too high, a side reaction may occur. The hydrogen pressure is normally 0.01 to 20 MPa, preferably 0.05 to 15 MPa, and more preferably 0.1 to 10 MPa. If the hydrogen pressure is too low, the hydrogenation rate may decrease to a large extent. If the hydrogen pressure is too high, it may be necessary to use a pressure reactor (i.e., the reaction equipment is limited). The reaction time (hydrogenation time) is not particularly limited as long as the desired hydrogenation ratio can be achieved. The reaction time is normally 0.1 to 10 hours.

The hydrogenation ratio (i.e., the ratio of main-chain double bonds that have been hydrogenated) of the dicyclopentadiene ring-opening polymer is not particularly limited, but is preferably 70% or more, more preferably 80% or more, particularly preferably 90% or more, and most preferably 99% or more. The heat resistance of the hydrogenated dicyclopentadiene ring-opening polymer increases as the hydrogenation ratio increases.

The hydrogenated dicyclopentadiene ring-opening polymer that is produced as described above maintains the syndiotacticity of the ring-opening polymer subjected to hydrogenation. Therefore, the resulting hydrogenated dicyclopentadiene ring-opening polymer has syndiotacticity. The ratio of racemo diads in the hydrogenated dicyclopentadiene ring-opening polymer used in connection with one embodiment of the invention is not particularly limited as long as the hydrogenated dicyclopentadiene ring-opening polymer has crystallinity, but is normally 55% or more, preferably 60% or more, and more preferably 65 to 99%.

Since the tacticity of a polymer does not change due to a hydrogenation reaction, a hydrogenated dicyclopentadiene ring-opening polymer that has syndiotacticity and crystallinity and includes a repeating unit derived from dicyclopentadiene can be obtained by hydrogenating the dicyclopentadiene ring-opening polymer that has syndiotacticity.

The ratio of racemo diads in the hydrogenated dicyclopentadiene ring-opening polymer can be quantitatively determined by analyzing the $^{13}$C-NMR spectrum (spectrum data) of the hydrogenated dicyclopentadiene ring-opening polymer. The ratio of racemo diads in the hydrogenated dicyclopentadiene ring-opening polymer can be determined by subjecting the hydrogenated dicyclopentadiene ring-opening polymer to $^{13}$C-NMR measurement at 150° C. using o-dichlorobenzene-$d_4$ as a solvent, and calculating the ratio of racemo diads based on the intensity ratio of the signal at 43.35 ppm (attributed to meso diads) to the signal at 43.43 ppm (attributed to racemo diads).

The melting point of the hydrogenated dicyclopentadiene ring-opening polymer that is used in connection with one embodiment of the invention is not particularly limited as long as the hydrogenated dicyclopentadiene ring-opening polymer has crystallinity, but is preferably 260 to 275° C. A resin composition that exhibits formability and heat resistance in a well-balanced manner can be obtained by utilizing the hydrogenated dicyclopentadiene ring-opening polymer that has a melting point within the above range. The melting point of the hydrogenated dicyclopentadiene ring-opening polymer can be adjusted by adjusting the degree of syndiotacticity (i.e., the ratio of racemo diads) of the hydrogenated dicyclopentadiene ring-opening polymer, or appropriately selecting the type of monomer, for example.

When producing a film using the hydrogenated dicyclopentadiene ring-opening polymer, an arbitrary additive may be added to the hydrogenated dicyclopentadiene ring-opening polymer taking account of the intended use.

Examples of the additive include an antioxidant such as a phenol-based antioxidant, a phosphorus-based antioxidant, and a sulfur-based antioxidant; a light stabilizer such as a hindered amine-based light stabilizer; a wax such as a petroleum-based wax, a Fischer-Tropsch wax, and a polyalkylene wax; a nucleator such as a sorbitol-based compound, a metal salt of an organophosphoric acid, a metal salt of an organic carboxylic acid, kaolin, and talc; a fluorescent whitening agent such as a diaminostilbene derivative, a coumarin derivative, an azole-based derivative (e.g., benzoxazole derivative, benzotriazole derivative, benzimidazole derivative, and benzothiazole derivative), a carbazole derivative, a pyridine derivative, a naphthalic acid derivative, and an imidazolone derivative; a UV absorber such as a benzophenone-based UV absorber, a salicylate-based UV absorber, and a benzotriazole-based UV absorber; an inorganic filler such as talc, silica, calcium carbonate, and glass fibers; a colorant; a flame retardant; a flame retardant promoter; an antistatic agent; a plasticizer; a near-infrared absorber; a lubricant; a filler; a polymer material other than the hydrogenated dicyclopentadiene ring-opening polymer, such as a soft polymer; and the like.

The unstretched film may be produced using an arbitrary method. The unstretched film may be produced using a known forming (molding) method.

Examples of the forming (molding) method include an injection molding method, an extrusion molding method, a press molding method, an inflation molding method, a blow molding method, a calendering method, a cast molding method, a compression molding method, and the like. It is preferable to use an extrusion molding method since it is possible to easily control the thickness of the resulting film, for example.

When forming a film using an extrusion molding method, the cylinder temperature (molten resin temperature) is normally set to 250 to 330° C., and preferably 260 to 310° C., the cast roll temperature is normally set to 45 to 160° C., and preferably 45 to 130° C., and the cooling roll temperature is normally set to 25 to 150° C., and preferably 45 to 120° C. A film-shaped formed article having a thickness of 1 μm to 1 mm can be easily obtained by extrusion molding using the resin composition according to one embodiment of the invention.

The unstretched film thus obtained is stretched to obtain a stretched film. The unstretched film may be stretched using an arbitrary method. The unstretched film may be stretched using a known method. For example, the unstretched film may be stretched using a uniaxial stretching method such as a method that uniaxially stretches the unstretched film in the machine direction by utilizing the difference in circumferential speed between rolls, or a method that uniaxially stretches the unstretched film in the transverse direction using a tenter-type stretching machine; a biaxial stretching method such as a simultaneous biaxial stretching method that stretches the unstretched film in the machine direction by increasing the interval between holding clips while stretching the unstretched film in the transverse direction by utilizing the spread angle of a guide rail, or a successive biaxial stretching method that stretches the unstretched film in the machine direction by utilizing the difference in circumferential speed between rolls, and stretches the unstretched film in the transverse direction using a tenter-type stretching machine while holding each end of the film using a clip; a method that continuously stretches the unstretched film diagonally at an arbitrary angle θ with respect to the widthwise direction of the film using a tenter-type stretching machine that can apply a feeding force, a tensile force, or a take-up force that differs in speed in the transverse direction or the machine direction; or the like.

The stretching temperature is normally set to 95 to 135° C., and preferably 100 to 130° C. If the stretching temperature is too low, the film may break during stretching, or a decrease in productivity may occur due to unclipping. If the stretching temperature is too high, a decrease in transparency or an increase in the coefficient of linear expansion may occur. The stretching ratio is normally set to 1.2 to 10, and preferably 1.5 to 5. If the stretching ratio is too low, an increase in the coefficient of linear expansion may occur. If the stretching ratio is too high, a decrease in transparency may occur. When using a biaxial stretching method, the stretching ratio is defined by the product of the stretching ratio in the machine direction and the stretching ratio in the transverse direction.

The resulting stretched film is heated to obtain a stretched film according to one embodiment of the invention. The stretched film may be heated using an arbitrary method. For example, the stretched film may be heated by introducing hot air into a heat treatment oven, or may be heated by utilizing radiant heat (e.g., using an infrared heater).

The heating temperature is normally set to 150 to 220° C., and preferably 160 to 210° C. If the heating temperature is too low, an increase in the coefficient of linear expansion may occur. If the heating temperature is too high, the heat resistance and the mechanical strength of the film may deteriorate. The heating time is normally set to 1 to 600 minutes, and preferably 3 to 300 minutes.

The method for producing a film (stretched film) according to one embodiment of the invention can thus produce a film that exhibits excellent optical properties and has a low coefficient of linear expansion.

A film produced using the method according to one embodiment of the invention may suitably be used for various applications (e.g., optical field, electronic/electrical field, medical field, food field, consumer product field, and civil engineering and construction field) by effectively utilizing the low coefficient of linear expansion of the film and the crystallinity of the hydrogenated dicyclopentadiene ring-opening polymer. The film produced using the method according to one embodiment of the invention is particularly suitable for the optical field, the electronic/electrical field, the medical field, and the like. The film produced using the method according to one embodiment of the invention may be used in the optical field as a retardation film, a polarizing film, an optical diffuser sheet, a condenser sheet, an optical card, a touch panel substrate film, a flexible display substrate film, and the like. The film produced using the method according to one embodiment of the invention may be used in the electronic/electrical field as an electronic material such as a flexible printed circuit board film, a film capacitor, a high-frequency circuit board film, an antenna substrate film, a battery separator film, and a release film. The film produced using the method according to one embodiment of the invention may be used in the medical field as an infusion bag, an intravenous drip bag, a press through package film, a blister package film, and the like.

EXAMPLES

The invention is further described below by way of examples and comparative examples. Note that the units "parts" and "%" used in the examples and the comparative examples respectively refer to "parts by weight" and "wt %" unless otherwise indicated.

The measurement methods and the evaluation methods used in connection with the examples and the comparative examples are described below.

(1) Molecular Weight (Weight Average Molecular Weight and Number Average Molecular Weight) of Cycloolefin Ring-Opening Polymer The molecular weight (weight average molecular weight and number average molecular weight) of the cycloolefin ring-opening polymer was determined as a polystyrene-equivalent value using a gel permeation chromatography (GPC) system ("HLC-8320" manufactured by Tosoh Corporation) and an H-type column (manufactured by Tosoh Corporation) (solvent: tetrahydrofuran, measurement temperature: 40° C.).

(2) Melting Point (Tm) of Hydrogenated Dicyclopentadiene Ring-Opening Polymer

A specimen that had been heated to 300° C. in a nitrogen atmosphere was rapidly cooled using liquid nitrogen, and heated at a heating rate of 10° C./min using a differential operation calorimeter (DSC) to determine the melting point of the specimen.

(3) Measurement of Haze of Film

An arbitrarily selected part of the film sample was cut to prepare a 50×50 mm square thin film sample, and the haze of the square thin film sample was measured using a haze meter ("NDH5000" manufactured by Nippon Denshoku Industries Co., Ltd.).

(4) Hydrogenation Ratio of Hydrogenated Cycloolefin Ring-Opening Polymer

The hydrogenation ratio of the hydrogenated cycloolefin ring-opening polymer was determined by $^1$H-NMR analysis (145° C., solvent: o-dichlorobenzene-$d_4$).

(5) Ratio of Racemo Diads in Hydrogenated Dicyclopentadiene Ring-Opening Polymer The hydrogenated dicyclopentadiene ring-opening polymer was subjected to $^{13}$C-NMR analysis (150° C., solvent: o-dichlorobenzene-$d_4$) using an inverse-gated decoupling method, and the ratio of racemo diads in the hydrogenated dicyclopentadiene ring-opening polymer was calculated based on the intensity ratio of the signal at 43.35 ppm (attributed to meso diads) to the signal at 43.43 ppm (attributed to racemo diads) using the peak (127.5 ppm) of o-dichlorobenzene-$d_4$ as a reference shift.

(6) Coefficient of Linear Expansion of Film

An arbitrarily selected part of the film sample was cut to prepare a rectangular thin film sample (stretching direction: 20 mm, direction orthogonal to stretching direction: 4 mm), and the coefficient of linear expansion of the rectangular thin film sample was measured using a TMA ("TMASS7100" manufactured by Hitachi High-Tech Science Corporation).

(7) Water Absorption of Film

An arbitrarily selected part of the film sample was cut to prepare a 50×50 mm square thin film sample, and the square thin film sample was allowed to stand for 24 hours in a container holding water at 25° C. The water absorption of the film was calculated from the ratio of the weight of the sample after the experiment to the weight of the sample before the experiment.

The hydrogenated dicyclopentadiene ring-opening polymer used in the examples and the comparative examples was synthesized as described below.

A metal autoclave (which had been sufficiently dried and in which the internal atmosphere had been replaced by nitrogen) was charged with 154.5 parts of cyclohexane, 42.8 parts of a 70% cyclohexane solution of dicyclopentadiene (endo-stereoisomer content: 99% or more) (amount of dicyclopentadiene: 30 parts), and 1.9 parts of 1-hexene, and the mixture was heated to 53° C.

Separately, 0.061 parts of a 19% diethylaluminum ethoxide/n-hexane solution was added to a solution prepared by dissolving 0.014 parts of a tetrachlorotungsten phenylimide-(tetrahydrofuran) complex in 0.70 parts of toluene, and the mixture was stirred for 10 minutes to prepare a catalyst solution.

The catalyst solution was added to the autoclave to initiate a ring-opening polymerization reaction. The mixture was reacted at 53° C. for 4 hours to obtain a solution of a dicyclopentadiene ring-opening polymer. The number average molecular weight (Mn) and the weight average molecular weight (Mw) of the resulting dicyclopentadiene ring-opening polymer were respectively 8,750 and 28,100, and the molecular weight distribution (Mw/Mn) calculated from the number average molecular weight (Mn) and the weight average molecular weight (Mw) was 3.21.

0.037 parts of 1,2-ethanediol (terminator) was added to 200 parts of the solution of the dicyclopentadiene ring-opening polymer, and the mixture was heated to 60° C., and stirred for 1 hour to terminate the polymerization reaction. After the addition of 1 part of a hydrotalcite-like compound ("Kyowaad (registered trademark) 2000" manufactured by Kyowa Chemical Industry Co., Ltd.), the mixture was heated to 60° C., and stirred for 1 hour. After the addition of 0.4 parts of Radiolite (registered trademark) #1500 (manufactured by Showa Chemical Industry Co., Ltd.) (filter aid), the adsorbent was filtered off from the solution using a PP pleated cartridge filter ("TCP-HX" manufactured by Advantec Toyo Kaisha, Ltd.). 100 parts of cyclohexane was added to 200 parts of the solution of the dicyclopentadiene ring-opening polymer (amount of polymer: 30 parts). After the addition of 0.0043 parts of chlorohydridocarbonyltris(triphenylphosphine)ruthenium, the dicyclopentadiene ring-opening polymer was hydrogenated at 180° C. for 4 hours under a hydrogen pressure of 6 MPa.

The resulting solution of the hydrogenated dicyclopentadiene ring-opening polymer was a slurry solution in which the polymer precipitated. The hydrogenated polymer was separated from the solution using a centrifuge, and dried at 60° C. for 24 hours under reduced pressure to obtain 28.5 parts of a crystalline hydrogenated dicyclopentadiene ring-opening polymer.

The hydrogenation ratio of the hydrogenated dicyclopentadiene ring-opening polymer was 99% or more, the melting point (Tm) of the hydrogenated dicyclopentadiene ring-opening polymer was 262° C., and the ratio of racemo diads in the hydrogenated dicyclopentadiene ring-opening polymer was 89%.

The film of the hydrogenated dicyclopentadiene ring-opening polymer used in the examples and the comparative examples was produced as described below.

1.1 parts of an antioxidant (tetrakis[methylene-3-(3',5'-di-t-butyl-4'-hydroxyphenyl)propionate]methane ("Irganox 1010" manufactured by BASF Japan Ltd.)) was added to 100 parts of the hydrogenated dicyclopentadiene ring-opening polymer, and the mixture was melt-extruded using a twin-screw extruder having four die holes (inner diameter: 3 mm) ("TEM-37B" manufactured by Toshiba Machine Co., Ltd.) to obtain a strand-shaped formed article, which was cut using a strand cutter to obtain a melt-extruded formed article (pellets).

The twin-screw extruder was operated under the following conditions.
Barrel temperature: 270 to 280° C.
Die temperature: 250° C.
Screw rotational speed: 145 rpm
Feeder rotational speed: 50 rpm The pellets were melt-extruded using a melt-extrusion film-forming machine provided with a T-die ("Measuring Extruder Type Me-20/2800V3" manufactured by Optical Control Systems), and a film having a thickness of 150 μm and a width of 120 mm was wound around a roll at a rate of 2 m/min.

The film-forming machine was operated under the following conditions.
Barrel temperature: 280 to 290° C.
Die temperature: 270° C.
Screw rotational speed: 30 rpm The haze of the resulting film was measured, and found to be 0.3%.

Example 1

An arbitrary part of the resulting film was cut to prepare a 90×90 mm square sample, and the square sample was stretched using a compact stretching machine ("EX10-B" manufactured by Toyo Seiki Seisaku-sho, Ltd.) to obtain a stretched film.

The compact stretching machine was operated under the following conditions.
Stretching rate: 10,000 mm/min
Stretching temperature: 100° C.
Stretching ratio: 2 (machine direction (MD) of film)

The stretched film was secured on an iron plate, and heated at 200° C. for 20 minutes in an oven. The melting point (Tm) and the haze of the resulting sample were measured, and found to be 262° C. and 0.5%, respectively.

The coefficient of linear expansion of the resulting sample was 21 ppm at 60 to 100° C., 116 ppm at 130 to 150° C., and 112 ppm at 170 to 180° C.

The water absorption of the resulting sample was 0.01% or less.

Example 2

A film sample was obtained in the same manner as in Example 1, except that the heating temperature in the oven was changed from 200° C. to 150° C.

The melting point (Tm) and the haze of the resulting sample were measured, and found to be 262° C. and 0.5%, respectively.

The coefficient of linear expansion of the resulting sample was 26 ppm at 60 to 100° C., 151 ppm at 130 to 150° C., and 196 ppm at 170 to 180° C.

Example 3

A film sample was obtained in the same manner as in Example 1, except that the heating temperature in the oven was changed from 200° C. to 220° C.

The melting point (Tm) and the haze of the resulting sample were measured, and found to be 262° C. and 0.6%, respectively.

The coefficient of linear expansion of the resulting sample was 23 ppm at 60 to 100° C., 110 ppm at 130 to 150° C., and 103 ppm at 170 to 180° C.

Example 4

A film sample was obtained in the same manner as in Example 1, except that the heating time in the oven was changed from 20 minutes to 5 minutes.

The melting point (Tm) and the haze of the resulting sample were measured, and found to be 262° C. and 0.6%, respectively.

The coefficient of linear expansion of the resulting sample was 26 ppm at 60 to 100° C., 30 ppm at 130 to 150° C., and 33 ppm at 170 to 180° C.

Example 5

A film sample was obtained in the same manner as in Example 1, except that the stretching temperature was changed from 100° C. to 130° C.

The melting point (Tm) and the haze of the resulting sample were measured, and found to be 262° C. and 0.4%, respectively.

The coefficient of linear expansion of the resulting sample was 86 ppm at 60 to 100° C., 169 ppm at 130 to 150° C., and 205 ppm at 170 to 180° C.

Example 6

A film sample was obtained in the same manner as in Example 1, except that the stretching ratio was changed from 2 to 4.

The melting point (Tm) and the haze of the resulting sample were measured, and found to be 262° C. and 0.8%, respectively.

The coefficient of linear expansion of the resulting sample was 21 ppm at 60 to 100° C., 101 ppm at 130 to 150° C., and 153 ppm at 170 to 180° C.

Example 7

A film sample was obtained in the same manner as in Example 1, except that the stretching method was changed from a uniaxial stretching method to a biaxial stretching method, and the stretching ratio was changed from 2 to 2×2.

The melting point (Tm) and the haze of the resulting sample were measured, and found to be 262° C. and 0.6%, respectively.

The coefficient of linear expansion of the resulting sample was 30 ppm at 60 to 100° C., 89 ppm at 130 to 150° C., and 141 ppm at 170 to 180° C.

Example 8

A film sample was obtained in the same manner as in Example 1, except that the stretching method was changed from a uniaxial stretching method to a biaxial stretching method, the stretching ratio was changed from 2 to 2×2, and the stretching temperature was changed from 100° C. to 120° C.

The melting point (Tm) and the haze of the resulting sample were measured, and found to be 262° C. and 0.5%, respectively.

The coefficient of linear expansion of the resulting sample was 29 ppm at 60 to 100° C., 142 ppm at 130 to 150° C., and 178 ppm at 170 to 180° C.

Example 9

A film sample was obtained in the same manner as in Example 1, except that the stretching method was changed from a uniaxial stretching method to a biaxial stretching method, and the stretching ratio was changed from 2 to 3×3.

The melting point (Tm) and the haze of the resulting sample were measured, and found to be 262° C. and 0.9%, respectively.

The coefficient of linear expansion of the resulting sample was 22 ppm at 60 to 100° C., 114 ppm at 130 to 150° C., and 123 ppm at 170 to 180° C.

Example 10

A film sample was obtained in the same manner as in Example 1, except that the stretching ratio was changed from 2 to 1.5.

The melting point (Tm) and the haze of the resulting sample were measured, and found to be 262° C. and 0.4%, respectively.

The coefficient of linear expansion of the resulting sample was 56 ppm at 60 to 100° C., 122 ppm at 130 to 150° C., and 143 ppm at 170 to 180° C.

Comparative Example 1

The coefficient of linear expansion of the film obtained by melt-extrusion was measured without stretching and heating the film, and found to be 82 ppm at 60 to 100° C.

However, since the film was not stretched and heated, the resin was not sufficiently crystallized within the film, and the Tg of the resin was lower than 130° C. Therefore, the coefficient of linear expansion at a temperature equal to or higher than 130° C. could not be measured since the film extended to a large extent.

Comparative Example 2

The film obtained by melt-extrusion was secured on an iron plate, and heated at 150° C. for 20 minutes in an oven.

The melting point (Tm) and the haze of the resulting sample were measured, and found to be 262° C. and 0.5%, respectively.

The coefficient of linear expansion of the resulting sample was 70 ppm at 60 to 100° C., 176 ppm at 130 to 150° C., and 412 ppm at 170 to 180° C.

Comparative Example 3

The film was stretched in the same manner as in Example 1, except that the stretching temperature was changed from 100° C. to 85° C. As a result, the film broke.

Comparative Example 4

A film sample was obtained in the same manner as in Example 1, except that the stretching temperature was changed from 100° C. to 140° C.

The melting point (Tm) and the haze of the resulting sample were measured, and found to be 262° C. and 5.1%, respectively.

The coefficient of linear expansion of the resulting sample was 78 ppm at 60 to 100° C., 133 ppm at 130 to 150° C., and 201 ppm at 170 to 180° C.

Comparative Example 5

A film sample was obtained in the same manner as in Example 1, except that the heating temperature in the oven was changed from 200° C. to 230° C.

The melting point (Tm) and the haze of the resulting sample were measured, and found to be 240° C. and 2.3%, respectively.

The coefficient of linear expansion of the resulting sample was 24 ppm at 60 to 100° C., 112 ppm at 130 to 150° C., and 114 ppm at 170 to 180° C.

Comparative Example 6

A film sample was obtained in the same manner as in Example 1, except that the stretching method was changed from a uniaxial stretching method to a biaxial stretching method, the stretching ratio was changed from 2 to 3.5×3.5, and the heating temperature in the oven was changed from 200° C. to 150° C.

The melting point (Tm) and the haze of the resulting sample were measured, and found to be 262° C. and 12.5%, respectively.

The coefficient of linear expansion of the resulting sample was 23 ppm at 60 to 100° C., 109 ppm at 130 to 150° C., and 202 ppm at 170 to 180° C.

The results obtained in Examples 1 to 10 and Comparative Examples 1 to 6 are summarized in Table 1 and 2.

A low coefficient of linear expansion at a high temperature could be maintain while maintaining low water absorption by stretching and heating the film formed of the crystalline hydrogenated dicyclopentadiene ring-opening polymer (Examples 1 to 10). An increase in the coefficient of linear expansion could be suppressed by optimizing the heating time (Examples 1 and 4).

When the stretching temperature was too high (Comparative Example 4), the haze of the film increased (i.e., the optical properties of the film deteriorated) as compared with the case where the optimum stretching temperature was used (Examples 1 and 5). The film broke (i.e., it was difficult to obtain a film sample in a stable manner) when the stretching temperature was too low (Comparative Example 3).

When the heating temperature was too high (Comparative Example 5), the melting point (Tm) of the film decreased (i.e., the heat resistance of the resin deteriorated) as compared with the case where the optimum heating temperature was used.

When the stretching ratio was too high (Comparative Example 6), the haze of the film increased (i.e., the optical properties of the film deteriorated) as compared with the case where the optimum stretching ratio was used (Examples 1, 6, 7, 9, and 10).

The invention claimed is:

1. A method for producing a stretched film comprising stretching an unstretched film that is formed using a crystalline hydrogenated dicyclopentadiene ring-opening polymer that has a ratio of raceme diads of 60% or more and a melting point of 260 to 275° C., at a temperature of 95 to

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Stretching method | Uniaxial | Uniaxial | Uniaxial | Uniaxial | Uniaxial | Uniaxial | Biaxial | Biaxial | Biaxial | Uniaxial |
| Stretching temperature | 100 | 100 | 100 | 100 | 130 | 100 | 100 | 120 | 100 | 100 |
| Stretching ratio | 2 | 2 | 2 | 2 | 2 | 4 | 2 × 2 | 2 × 2 | 3 × 3 | 1.5 |
| Heating temperature | 200 | 150 | 220 | 200 | 200 | 200 | 20 | 200 | 200 | 200 |
| Heating time | 20 | 20 | 20 | 5 | 20 | 20 | 20 | 20 | 20 | 20 |
| Tm | 262 | 262 | 262 | 262 | 262 | 262 | 262 | 262 | 262 | 262 |
| Haze | 0.5 | 0.5 | 0.6 | 0.6 | 0.4 | 0.8 | 0.6 | 0.5 | 0.9 | 0.4 |
| Coefficient of linear expansion | | | | | | | | | | |
| 60 to 100° C. | 21 | 26 | 23 | 26 | 86 | 21 | 30 | 29 | 22 | 56 |
| 130 to 150° C. | 116 | 151 | 110 | 30 | 169 | 101 | 89 | 142 | 114 | 122 |
| 170 to 180° C. | 112 | 196 | 103 | 33 | 205 | 153 | 141 | 178 | 123 | 143 |

| | Comparative Example | | | | | |
|---|---|---|---|---|---|---|
| | 1 | 2 | 3 | 4 | 5 | 6 |
| Stretching method | — | — | Uniaxial | Uniaxial | Uniaxial | Biaxial |
| Stretching temperature | — | — | 85 | 140 | 100 | 100 |
| Stretching ratio | — | — | 2 | 2 | 2 | 3.5 × 3.5 |
| Heating temperature | — | 150 | — | 200 | 230 | 150 |
| Heating time | — | 20 | — | 20 | 20 | 20 |
| Tm | 262 | 262 | Film broke | 262 | 240 | 262 |
| Haze | 0.4 | 0.5 | | 5.1 | 2.3 | 12.5 |
| Coefficient of linear expansion | | | | | | |
| 60 to 100° C. | 82 | 70 | | 78 | 24 | 23 |
| 130 to 150° C. | — | 176 | | 133 | 112 | 109 |
| 170 to 180° C. | — | 412 | | 201 | 114 | 202 |

The following were confirmed from the results shown in Table 1.

135° C. and a stretching ratio of 1.2 to 10, followed by heating at a temperature of 150 to 220° C. to obtain the stretched film; wherein a haze of the stretched film is 0.9% or less, and a coefficient of linear expansion of the stretched film is:
- 86 ppm or less at 60 to 100° C.,
- 169 ppm or less at 130 to 150° C., and
- 205 ppm or less at 170 to 180° C.

2. An optical film produced using the method for producing a stretched film according to claim 1.

3. An electronic material produced using the method for producing a stretched film according to claim 1.

* * * * *